June 24, 1930. C. C. BRADBURY 1,767,505
CENTRALIZED LUBRICATING SYSTEM
Filed Oct. 22, 1928 2 Sheets-Sheet 2
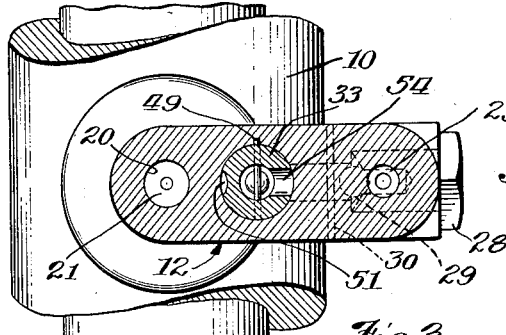
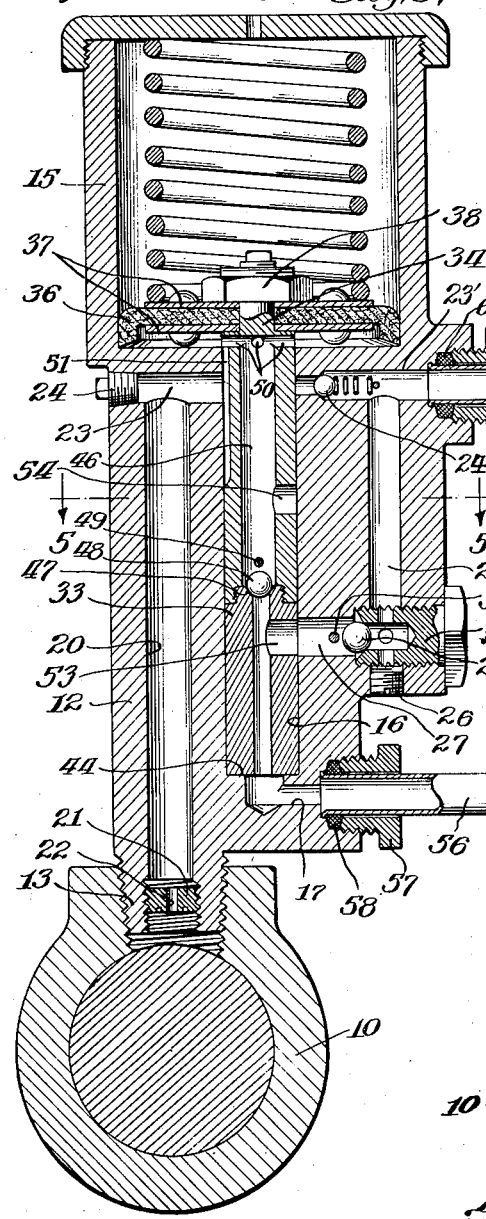
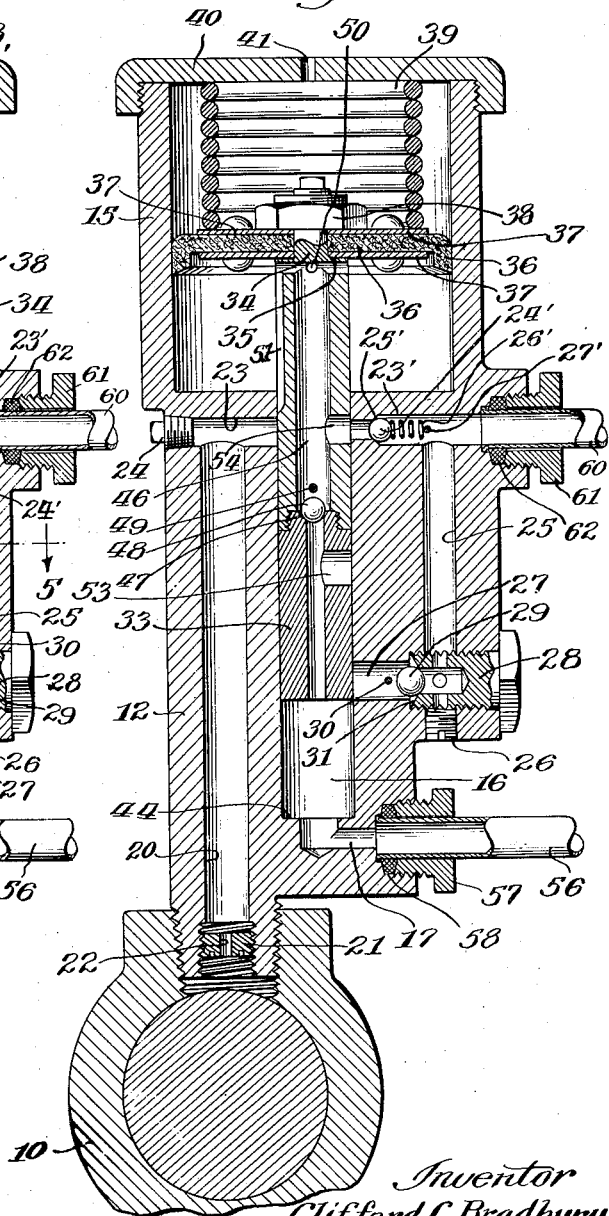
Inventor
Clifford C. Bradbury Patented June 24, 1930

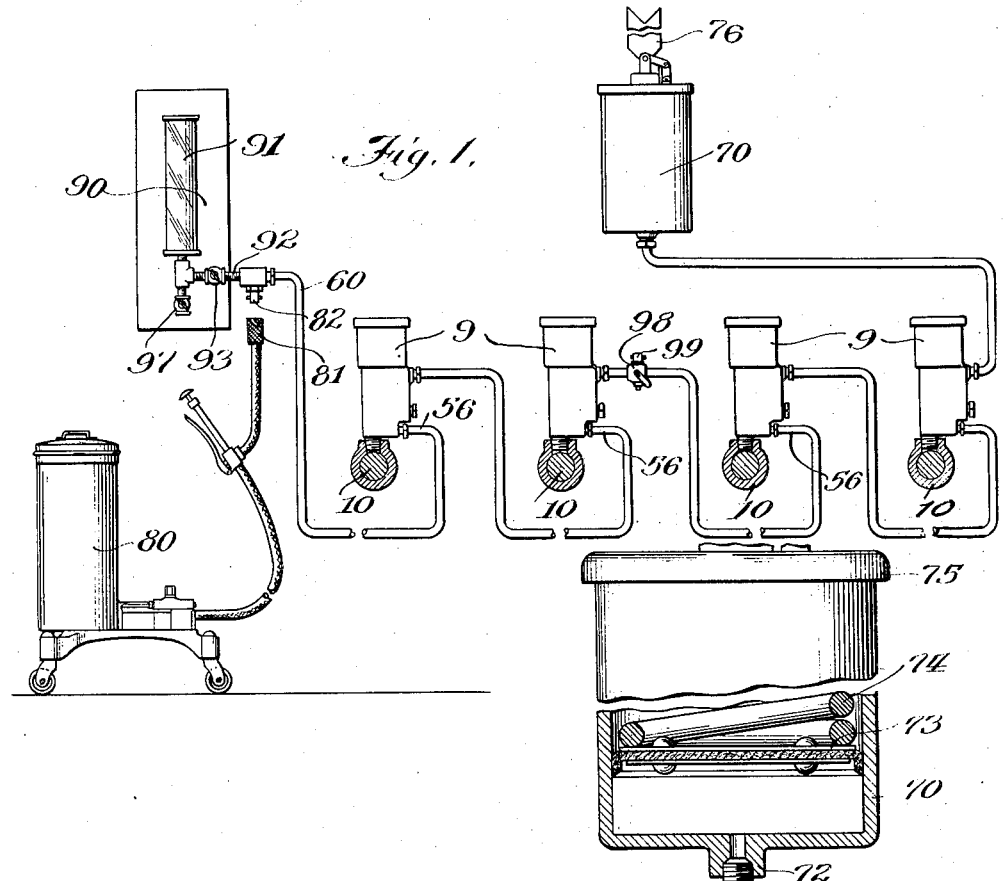
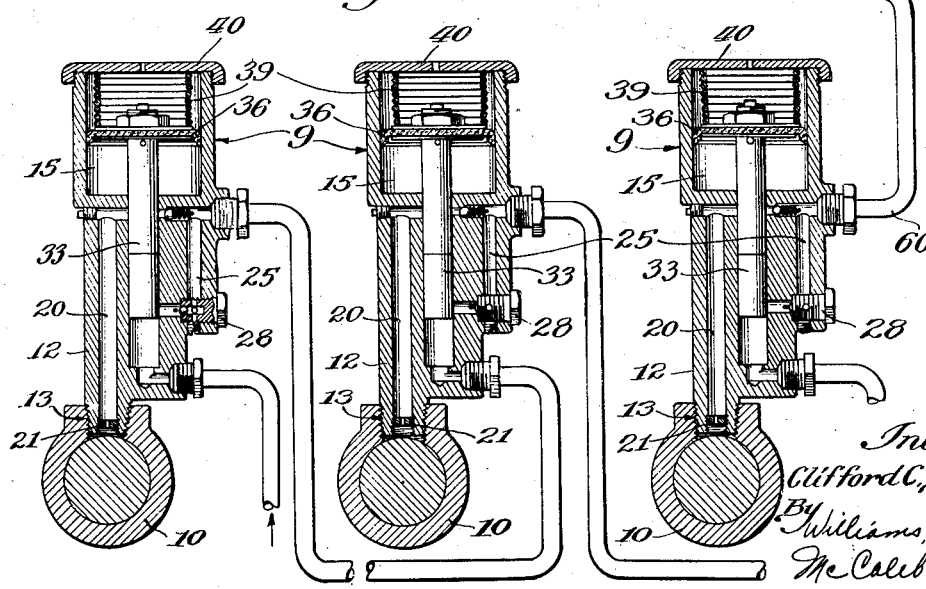

1,767,505

UNITED STATES PATENT OFFICE

CLIFFORD C. BRADBURY, OF GLENCOE, ILLINOIS, ASSIGNOR TO ALEMITE CORPORATION, OF CHICAGO, ILLINOIS, A CORPORATION OF DELAWARE

CENTRALIZED LUBRICATING SYSTEM

Application filed October 22, 1928. Serial No. 314,006.

My invention relates to lubricating apparatus and more particularly to centralized lubricating systems for lubricating a plurality of bearings from a single source of lubricant supply, in which centralized lubricating systems it is common to provide a measuring valve adjacent each bearing to be lubricated for the purpose of metering the quantities of lubricant supplied to the several bearings.

An object of my invention is to provide a new and improved centralized lubricating system.

Another object is to provide a new and improved measuring valve for such a system.

Another object is to provide a centralized lubricating system having an indicator which gives a signal only when each and every one of the measuring valves in the system has been completely filled with lubricant.

Another object is to provide a centralized lubricating system including indicator means operative only upon the exhaustion of the supply of lubricant in each and every one of the measuring valves to indicate that each and every bearing supplied by the system has received its allotted share of lubricant.

It is still another object of my invention to provide a plurality of connecting measuring valves in a system of centralized lubrication which are adapted to successively receive predetermined quantities of lubricant and an indicator connected in the system to show whether or not all of the measuring valves are operating properly.

Still another object of my invention is to provide in a system of centralized lubrication means to detect defects in the system.

And another object is to provide a centralized lubricating system having means which will indicate faulty operation on the part of any measuring valve in the entire system.

Other objects and advantages of my invention will become more apparent from the following detailed description and accompanying drawings, in which Figure 1 is a schematic general view of my new and improved lubricating system;

Figure 2 is a vertical cross sectional view of a connected group of the measuring valves of my invention and the indicator tank;

Figure 3 is an enlarged vertical cross sectional view of one of the measuring valves of my invention mounted on a bearing and showing the parts in the positions which they assume when the reservoir of the valve is empty;

Figure 4 is a similar enlarged cross sectional view of one of the measuring valves, showing the parts in the positions which they assume when the reservoir is filled; and Figure 5 is an enlarged horizontal cross sectional view taken on the line 5—5 of Figure 3.

Referring, now, to the drawings, in which like reference characters designate like parts throughout the several views, the numeral 9 indicates, in general, one of the measuring valves of my invention shown mounted on a bearing 10 to be lubricated. Referring to Figure 3, 12 indicates the lower body portion of the valve 9 having a screwthreaded boss 13 at the extreme lower end for securing the measuring valve to a bearing 10. The upper part of the valve is formed into a reservoir chamber 15 for containing lubricant.

A vertical central bore 16 extends from the bottom of the chamber 15 down through the body 12, terminating in a horizontally disposed inlet 17 located in the bottom of the body 12. A second vertical bore 20 passes through the boss 13, affording a passage for lubricant, and a resistance member 21 is screwthreaded in the lower end of the bore 20 and has a relatively small hole 22 therein to limit the flow of lubricant into the bearing. A horizontal bore 23 at the upper end of the bore 20 connects with the central bore 16. A screw plug 24 is mounted in the body 12 at one end of the bore 23 to provide access to the bore 23 in event of necessity of repairs or cleaning.

An outlet 23′ is located in the body 12 opposite the bore 23 and in alignment therewith, connecting with the central bore 16 and providing an outlet for lubricant. A ball check valve 24' is held on a seat 25' in the outlet 23' by a light spring 26' which rests on a pin 27'. Thus backflow of lubricant is prevented.

A vertical return passage 25 extends downwardly from the outlet 23' and has a screw plug 26 in its lower end. A short horizontal passage 27 connects the lower end of this return passage with the central bore 16. A screwthreaded cage 28 is mounted in the lower end of the return passage 25 and is apertured to allow passage of lubricant. A ball check valve 29 is held in place in the passage 27 between a pin 30 and a conical seat 31 formed in the inner end of the cage 28. This valve prevents flow of lubricant into the passage 25 from the central bore 16 but allows lubricant to flow out of the return passage 25.

A piston 33 is reciprocably mounted in the central bore 16 and has a reduced screwthreaded portion 34 on its upper end providing a shoulder 35 on which is mounted a cup leather plunger 36 having metal washers 37 on each side thereof to aid in maintaining the shape of the cup leather. A hexnut 38 secures the plunger 36 on the upper end of the piston 33. The plunger 36 is reciprocable in the reservoir 15 and a compression spring 39 urges the plunger downwardly toward the bottom of the reservoir 15. A cover 40, having an air vent 41 therein, is screwthreaded on the top of the reservoir 15 and provides a seat for the spring 39. The piston 33 is made in two parts screwthreaded together, and the lower end abuts a shoulder 44 formed at the lower end of the bore 16. The length of the piston 33 allows the lower end to rest on the abutment 44 when the plunger 36 is very near the bottom of the reservoir 15, as illustrated in Figure 3.

The piston 33 has a central bore 46 which provides a lubricant passage and this bore is reduced at the lower portion of the piston to form a conical seat 47 for a ball check valve 48 which is limited in its upward movement by a cross pin 49. The upper end of the piston 33 is cross drilled with holes 50 which provide an outlet for lubricant into the chamber 15.

It will be noted that the cross drilled holes 50 are located near the top of the piston 33 so that lubricant may flow outwardly from these holes into the chamber 15 when the piston 33 occupies its lowest position and rests on the abutment 44. An elongated by-pass 51 is cut in one side of the piston 33 and near the upper end thereof, connecting with the cross drill holes 50 and in alignment with the horizontal bore 23. This by-pass 51 is long enough to maintain communication with the bore 23 at all times except when the piston 33 is at the extreme uppermost part of its stroke when such communication will be cut off.

A horizontal aperture 53 is drilled in the side of the piston 33 in alignment with the lubricant passage 27 when the piston 33 rests on the abutment 44. A second horizontal aperture 54 is drilled in the side of the piston 33 adapted to be aligned with the outlet passage 23' when the piston 33 and plunger 36 have reached the limit of their upward movement, that is, when the reservoir chamber 15 is filled with lubricant.

An end 56 of an oil conducting tube is connected in the inlet passage 17 by a screwthreaded nut 57 which locks the tube 56 in leak-proof connection in the inlet 17 by means of a felt washer or packing 58. The end 60 of a like oil conducting tube is mounted in the outlet 23' by means of a screwthreaded nut 61 and leak-proof gasket 62.

A plurality of the measuring valves 9, such as have been herein described, are connected with bearings 10 and are connected together, as shown in Figures 1 and 2, by oil conducting tubes which have been designated by the numeral 56 at the inlet and 60 at the outlet end, which allow for a flow of oil from the outlet of one measuring valve to the inlet of the next succeeding measuring valve and this plurality of measuring valves 9 are connected by the oil tube 60 of the last measuring valve with an oil reservoir 70 by means of a screw nut 71 which is threaded into a bossed inlet 72 located in the lower end of the reservoir 70. A reciprocable leather plunger 73 is mounted in the reservoir 70 and urged downwardly by a compression spring 74 disposed between the upper part of the plunger and screwthreaded cap 75 which is mounted at the top of the reservoir. The cap 75 supports a semaphore signal arm 76, of any well known type, which is adapted to be tilted to a horizontal position when the plunger 73 is in its uppermost position indicating that the reservoir 70 is filled with lubricant, and is adapted to be tilted to a vertical position when the plunger 73 reaches the bottom of the reservoir 70, thereby indicating that the lubricant reservoir 70 is empty.

A lubricant compressor 80, of a well known high pressure type, is used to supply lubricant through suitable discharge conduit and coupling means 81 to the system of measuring valves herein described by connection with a connector fitting 82, of well known construction, which has a check valve to prevent return of lubricant and which is mounted in the end 60 of the oil conducting tube which leads to the inlet 17 of the first of the series of measuring valves 9, as illustrated in Figure 1.

A lubricant indicator 90 is connected in series with the system and comprises a glass tube 91 connected by a tube 92 with the oil conducting inlet 60. A shut off cock 93 is located in the tube 92 to cut off communication between the indicator 90 and the rest of the system when the system is being filled. A drain valve 97 is located in the lower part of the indicator 90.

The operation of the system is as follows:
The operator in charge of the maintenance of a line of bearings, for example, such as are used in industrial purposes in a line drive shaft, will connect the coupling 81 of the compressor 80 to the fitting 82 and inject lubricant into the system, which lubricant will flow through the oil tube 60 to the inlet portion 56 thereof, which is connected to the measuring valve 9, as shown in Figures 3 and 4, into the inlet 17, from whence the lubricant will flow upwardly through the central bore 46, passing the ball check valve 48 which allows lubricant to flow upwardly in the piston 33. Lubricant will flow out of the top of the piston 33 through cross drill holes 50 into the chamber 15 below the plunger 36 and will then flow into the elongated by-pass 51 and into the horizontal bore 23 and down into the vertical bore 20. The lubricant will then flow through the small hole 22 in the resistance member 21, into the bearing 10, thereby lubricating the bearing.

It is apparent that the resistance member 21 will not distribute the lubricant as rapidly as it will be injected into the system. Therefore, the bore 20 will become filled with lubricant and as the bore 20 and by-pass 51 are completely filled, the inflowing lubricant will meet with the resistance caused by the member 21. Thereupon, the spring 39 will be compressed by the pressure of the incoming lubricant and the plunger 36 will be raised. It will also be noted at this point that the inflowing lubricant cannot escape through the opening 54 because of the position of the piston 33, nor through the opening 53 because of the ball check valve 29. When the inflowing lubricant has filled the reservoir chamber and raised the plunger 36 to its uppermost position, as illustrated in Figure 4, the opening 54 will be aligned with the outlet 23' and the bottom of the by-pass 51 will be raised above the bore 23, preventing communication therebetween, and further inflowing lubricant will escape through the outlet 23' and outlet portion 60 of the connecting oil tubes. The lubricant cannot return through the passage 25 into the bore 16 because the opening 53 has been raised with the piston 33 and escape of lubricant through the return passage 27 is thereby cut off.

After the reservoir chamber 15 of the measuring valve has been filled, as described, the lubricant will flow through the outlet 60 of the oil conducting tube to the inlet portion 56 thereof which is connected with the inlet 17 of the next succeeding measuring valve 9 which is connected in the series. This valve will likewise be filled as described and the lubricant will thence flow on to the third succeeding valve and so on. When the last measuring valve in the series has been filled, the lubricant flowing from the outlet tube 60 of this valve will enter the reservoir tank 70 and fill it, raising the plunger 73 to lower the semaphore 76. When the operator sees the semaphore 76 on the reservoir tank 70 drop to horizontal position, he knows that the entire system has been filled with lubricant and that the lubricant has passed through all the measuring valves into the reservoir tank 70. He then disconnects the compressor 80 and the system is filled and ready for operation.

A slow seepage of lubricant past the piston 33 into the bore 23 occurs when the measuring valve 9 is completely filled, thus lowering the piston 33 sufficiently to bring the by-pass 51 into alignment with the bore 23. As the lubricant is fed through the resistance member 21 to the bearings, the supply in the reservoir chambers 15 of the measuring valves 9 will gradually become depleted until finally the system needs more lubricant.

The shut-off cock 93 of the lubricant indicator 90 is normally closed when lubricant is forced into the system, as hereinbefore described. After the operator has filled the system and the semaphore 76 indicates that the system has been filled, the operator turns the cock 93, thereby providing communication between the oil inlet 60 and the glass tube 91 of the indicator 90 of my invention.

After the lubricant in the reservoir chambers 15 has been fed to the system and the piston 33 has been lowered to rest upon the abutment 44, lubricant from the reservoir tank 70 will be allowed to flow into the outlet passage 23' down through the return passage 25, passing the ball check valve 29 and through the return passage 27 and thence into the central bores 46 of the piston 33 through the aperture 53 which will then be in alignment with the return passage 27. The lubricant flows therefrom into the oil inlet 56 and back into the next preceding measuring valve 9, flowing through this valve in a like manner, providing, of course, that the piston 33 of this valve rests upon the abutment 44, and the flow continues all through the series of measuring valves 9 until the lubricant will pass through the pipe 92, cock 93 and enter the glass 91 of my indicator 90.

In the event that any one of the measuring valves 9 should stick or otherwise cease to function, this return flow of lubricant would be prevented because lubricant can flow from the indicator tank 70 through the valves only when each of the valves 9 is empty and the piston 33 down on the abutment 44 and therefore the difficulties encountered in many prior systems are overcome, such, for example, as a measuring valve becoming stuck in its uppermost or open position thereby allowing flow of lubricant to the next succeeding valve without lubricating the bearing on which the defective valve is mounted. In the valve of my invention it is impossible for any one bearing to be so neglected because any such defects are apparent to the operator.

When the operator observes that the system needs filling by the position of the semaphore 76, he need but to look at the indicator 90 to note whether the lubricant from the reservoir tank 70 has been returned through the entire system and appears in the glass tube 91 of the indicator 90. If the indicator 90 contains this return flow of oil, the system is in perfect working order and the operator may refill the system as hereinbefore described. Before refilling, however, the glass tube 91 of the indicator 90 is drained through the medium of the valve 97 so that the tube may be free to receive return lubricant from the reservoir.

If one of the measuring valves has some defect which prevents the return of this lubricant, the indicator 90 will not show sufficient oil in the glass 91 and the operator will know that one of the valves is defective and may make the necessary repairs before the bearing has run long enough without lubrication to do serious damage.

A three-way valve 98, having a connector fitting 99 therein, may be located between groups of the measuring valves 9 as shown in Figure 1. Thus, tests may be made by the operator at various places throughout the system to indicate where the faulty valve is located. The valve 98 may be used to drain part of the system or to inject lubricant to make these tests.

While I have described a preferred embodiment of my invention it is to be clearly understood that my invention is not limited to these details but is capable of other modifications within the scope of the appended claims.

What I claim and desire to secure by United States Letters Patent is:

1. A system of lubrication comprising a plurality of bearings to be lubricated, a lubricant measuring device associated with each of said bearings and adapted to receive a charge of lubricant to be subsequently delivered to said bearings, means to open an outlet passage when the measuring device is filled, a conduit connecting said outlet with an inlet passage of the next adjacent device, a semaphore connected to the last device in the series to indicate when the devices are filled, and a visible indicator to indicate when all the devices are empty.

2. A system of lubrication comprising a plurality of bearings to be lubricated, a lubricant measuring device associated with each of said bearings, conduits connecting said devices, means to successively fill said devices with lubricant, means to indicate when said devices are filled, and separate means to indicate when the devices are empty.

3. A system of lubrication comprising a plurality of bearings to be lubricated, a lubricant measuring device associated with each of said bearings, conduits connecting said devices, an indicator tank connected with the last of the series of measuring devices, means to supply lubricant to the measuring devices successively and thereafter to the indicator tank, a visible gauge connected in the system before the first measuring device, and means to cause the lubricant to flow from the indicator tank back through the system and into the visible gauge when the measuring devices are all empty.

4. A system of lubrication comprising a plurality of bearings to be lubricated, a lubricant measuring device associated with each of said bearings, conduits connecting the outlet of each of said devices with the inlet of the next succeeding device, means to supply lubricant to the system under pressure, means to allow flow of lubricant from each of said measuring devices when filled to the next succeeding device, an indicator tank connected with the last of the series of devices to receive lubricant therefrom, a visible indicator connected in the system before the first of the series of devices, and a return valve in each device operating when the device is empty to afford communication between the indicator tank and the visible indicator thereby to allow lubricant to flow back through the system to the visible indicator to show when the system is empty.

5. A system of lubrication comprising a plurality of bearings to be lubricated, a lubricant measuring device associated with each of said bearings, conduits connecting the outlet of each of said devices with the inlet of the next succeeding device, means to supply lubricant to the system under pressure, means to allow flow of lubricant from each of said measuring devices when filled to the next succeeding device, an indicator tank connected with the last of the series of devices to receive lubricant therefrom, a visible indicator connected in the system, and means operable when each measuring device is empty to allow lubricant to flow back through the system to the visible indicator.

6. In combination with a series or progressive system for lubricating a plurality of bearings, a measuring valve associated with each bearing, means to successively fill each measuring valve and thereupon fill a visible indicating tank, and means in said system actuated by a backflow of lubricant from said indicating tank when all of the valves are empty to indicate the emptying of said valves.

7. In combination with a series or progressive system for lubricating a plurality of bearings, a measuring valve associated with each of said bearings, a reservoir tank connected in the system with the last valve in the series, a supply compressor, means affording connection between said supply compressor and reservoir tank when all of the valves are filled, and means allowing return flow of this lubricant when said valves are empty.

8. In combination with a series or progressive system for lubricating a plurality of bearings, a measuring valve associated with each of said bearings, a reservoir tank, means allowing flow of lubricant to the reservoir tank when the system is filled with lubricant, means allowing return flow of lubricant from the reservoir through all the valves of the system when the system is empty, and a visible indicator to show the amount of this return flow.

9. A measuring valve for use in a progressive system of lubrication, a chamber affording communication with a bearing, a resistance unit to regulate the flow of lubricant to said bearing in said chamber, a reservoir chamber, an inlet communicating with said chambers, an outlet adapted to become effective when both of said chambers are filled with lubricant, and a separate return passage connecting the outlet and inlet to allow return flow of lubricant when the reservoir chamber is empty.

10. A measuring valve for use in a progressive system of lubrication, a resistance unit to regulate flow of lubricant to the bearing to be lubricated, a reservoir chamber, an inlet affording communication with said chamber, an outlet communicating with the reservoir chamber, a valve in said outlet closed to prevent outflowing of lubricant when the reservoir chamber is empty, means to open said valve when the reservoir is filled with lubricant, a separate return passage extending from the inlet to the outlet beyond said valve, and a second valve in said return passage adapted to open when the reservoir is empty to afford communication between the outlet and the inlet.

11. A measuring valve for use in a progressive system of lubrication, a resistance unit to regulate flow of lubricant to the bearing to be lubricated, a reservoir chamber, an inlet communicating with said chamber, an outlet communicating with said chamber, a valve in said outlet normally closing the outlet and adapted to open said outlet only when the reservoir is completely filled, a separate return passage disposed between the inlet and the outlet beyond said valve, and a second valve disposed in said return passage normally closing said passage and adapted to open said passage only when the reservoir is completely empty.

12. A measuring valve for use in a progressive system of lubrication, a resistance unit to regulate flow of lubricant to the bearing to be lubricated, a reservoir chamber, an inlet communicating with said chamber, an outlet communicating with said chamber, a sliding valve communicating with said chamber, means causing said valve to also communicate with said outlet only when the reservoir chamber is completely filled with lubricant, and means to cause the sliding valve to communicate with the inlet when the reservoir chamber is entirely emtpy.

In witness whereof, I hereunto subscribe my name this 19th day of October, 1928.

CLIFFORD C. BRADBURY.